(12) United States Patent  (10) Patent No.: US 7,499,726 B2
Kaminsky  (45) Date of Patent: Mar. 3, 2009

(54) COMPUTER PHONE

(75) Inventor: David L. Kaminsky, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 584 days.

(21) Appl. No.: 10/672,030

(22) Filed: Sep. 26, 2003

(65) Prior Publication Data
US 2005/0070313 A1 Mar. 31, 2005

(51) Int. Cl.
H04M 1/00 (2006.01)
H04B 1/38 (2006.01)

(52) U.S. Cl. .................. 455/557; 455/556.1; 455/552.1; 455/553.1

(58) Field of Classification Search .............. 455/556.1, 455/556.2, 557, 552.1, 553.1, 90.1, 90.2, 455/462
See application file for complete search history.

(56) References Cited

U.S. PATENT DOCUMENTS

| | | | | |
|---|---|---|---|---|
| 4,661,659 | A * | 4/1987 | Nishimura | 455/462 |
| 5,005,183 | A * | 4/1991 | Carey et al. | 375/130 |
| 5,452,289 | A * | 9/1995 | Sharma et al. | 370/286 |
| 5,799,067 | A * | 8/1998 | Kikinis et al. | 379/93.06 |
| 5,930,719 | A * | 7/1999 | Babitch et al. | 455/462 |
| 6,289,213 | B1 * | 9/2001 | Flint et al. | 455/420 |
| 6,507,610 | B1 * | 1/2003 | Saadeh et al. | 375/222 |
| 6,522,640 | B2 * | 2/2003 | Liebenow | 370/338 |
| 6,954,616 | B2 * | 10/2005 | Liang et al. | 455/63.1 |
| 6,957,086 | B2 * | 10/2005 | Bahl et al. | 455/557 |
| 7,002,995 | B2 * | 2/2006 | Chow et al. | 370/485 |
| 7,046,649 | B2 | 5/2006 | Awater | |
| 2001/0010689 | A1 * | 8/2001 | Awater et al. | 370/344 |
| 2003/0223461 | A1 * | 12/2003 | Sharma et al. | 370/493 |
| 2004/0120301 | A1 * | 6/2004 | Kitchin | 370/345 |
| 2005/0009525 | A1 * | 1/2005 | Evslin | 455/445 |

OTHER PUBLICATIONS

"How Cordless Telephones Work," Freudenrich, Craig C., <<http://www22.verizon.com/about/community/learningcenter/articles/displayarticle1/0,1727,1011z1.html>>.
"How Cordless Telephones Work," Freudenrich, Craig C., <<http://www22.verizon.com/about/community/learningcenter/articles/displayarticle1/0,4065,1011z2,00.html>>.
"How Cordless Telephones Work," Freudenrich, Craig C., <<http://www22.verizon.com/about/community/learningcenter/articles/displayarticle1/0,1727,1011z3,00.html>>.
"How Cordless Telephones Work," Freudenrich, Craig C., <<http://www22.verizon.com/about/community/learningcenter/articles/displayarticle1/0,1727,1011z4,00.html>>.
"How Cordless Telephones Work," Freudenrich, Craig C., <<http://www22.verizon.com/about/community/learningcenter/articles/displayarticle1/0,1727,1011z5,00.html>>.

(Continued)

Primary Examiner—Duc M Nguyen
(74) Attorney, Agent, or Firm—Jeanine Ray-Yarletts, Esq.; Stevens M. Greenberg, Esq.; Carey Rodriguez Greenberg & Paul LLP

(57) ABSTRACT

A computer integrated cordless phone. The phone can include a cordless handset transceiver configured for coupling to an antenna shared with a wireless network adapter through a multiplexer/demultiplexer so that both of the cordless handset transceiver and the wireless network adapter transmit and receive data within a common wireless frequency spectrum. In a preferred embodiment, the cordless handset transceiver can include a further configuration for coupling to a central processing unit, audio processing circuitry and power supply within a computing device shared with the wireless network adapter. Notably, the common wireless frequency spectrum can include the ISM frequency band.

9 Claims, 3 Drawing Sheets

OTHER PUBLICATIONS

"*How Cordless Telephones Work*," Freudenrich, Craig C., <<http://www22.verizon.com/about/community/learningcenter/articles/displayarticle1/0,1727,1011z6,00.html>>.

"*ISM 2.4 Ghz Cordless Phone (Hand Set) System Block Diagram*" Toshiba America Electronic Components, Inc., <<http://222.toshiba.com/taec/applications/ISM_Hand_set.shtml>>.

"*Here's a top-level block diagram of our project*" KSU Digital Radio Hardware Design Class Project Diagram, <<http://www.eece.ksu.edu/wkuhn/dr_block.html>>.

"*A-Team Transiever Block Diagram EECE 690/890 Digital Radio Hardware Design*", <<http://www.eece.ksu.edu/wkuhn/rfblock.html>>.

"*900MHz Cordless Phone Bugging*", Anonymous author; MaxLast modified on Mar. 22, 2003.

"*How Cordless Telephones Work*," Freudenrich, Craig C., <<http://www22.verizon.com/about/community/learningcenter/articles/displayarticle1/0,1727,1011z1.html>> Aug. 2003.

"*How Cordless Telephones Work*," Freudenrich, Craig C., <<http://www22.verizon.com/about/community/learningcenter/articles/displayarticle1/0,4065,1011z2,00.html>> Aug. 2003.

"*How Cordless Telephones Work*," Freudenrich, Craig C., <<http://www22.verizon.com/about/community/learningcenter/articles/displayarticle1/0,1727,1011z3,00.html>> Aug. 2003.

"*How Cordless Telephones Work*," Freudenrich, Craig C., <<http://www22.verizon.com/about/community/learningcenter/articles/displayarticle1/0,1727,1011z4,00.html>> Aug. 2003.

"*How Cordless Telephones Work*," Freudenrich, Craig C., <<http://www22.verizon.com/about/community/learningcenter/articles/displayarticle1/0,1727,1011z5,00.html>> Aug. 2003.

"*How Cordless Telephones Work*," Freudenrich, Craig C., <<http://www22.verizon.com/about/community/learningcenter/articles/displayarticle1/0,1727,1011z6,00.html>> Aug. 2003.

"*ISM 2.4 Ghz Cordless Phone (Hand Set) System Block Diagram*" Toshiba America Electronic Components, Inc., <<http://222.toshiba.com/taec/applications/ISM_Hand_set.shtml>> Aug. 2003.

"*Here's a top-level block diagram of our project*" KSU Digital Radio Hardware Design Class Project Diagram, <<http://www.eece.ksu.edu/wkuhn/dr_block.html>> Sep. 1998.

"*A-Team Transiever Block Diagram EECE 690/890 Digital Radio Hardware Design*", <<http://www.eece.ksu.edu/wkuhn/rfblock.html>> Aug. 2003.

"*900MHz Cordless Phone Bugging*", Anonymous author; MaxLast modified on Mar. 22, 2003.

* cited by examiner

COMPUTER PHONE

BACKGROUND OF THE INVENTION

1. Statement of the Technical Field

The present invention relates to the field of computer integrated telephony.

2. Description of the Related Art

Computer integrated telephony to date involves the use of a personal computer interface to establish and maintain a telephone call. Typically, where a personal computer has been configured with a modem communicatively coupled via twisted pair to a telephone outlet, a graphical user interface can be provided within the personal computer through which a user can initiate or receive a telephone call. Notably, an integrated microphone and speakers can provide the transducive means by which the user can maintain a telephone call through the personal computer, just as if the user had established the telephone call through an ordinary corded telephone handset.

Nevertheless, the era of the corded telephone has come to an end and the world of the cordless handset has overtaken the marketplace. While early cordless phones operated within the forty-five (45) megahertz (MHz) frequency spectrum based upon which the quality of reception varied from the barely tolerable to inoperable, newer phones of only a decade ago operated at nine-hundred (900) MHz. Most recently, cordless phones have operated in the industrial scientific medical (ISM) frequency spectrum of 2.4 gigahertz (GHz). Within the 2.4 GHz frequency spectrum, the quality of a telephone call has reached new heights and the quality has rivaled that of the corded telephone.

While the success of the 2.4 GHz cordless handset quickly consumed the market, the same cannot be said of computer integrated telephony. In this regard, computer modems remain bound to the twisted pair as the acceptable market price point for a computer modem does not permit the integration within the modem of a wireless transceiver required to communicate with a 2.4 GHz base station. Consequently, the end user of a computer remains bound to the cordless handset to initiate and maintain a telephone call and computer integration heretofore has not been possible.

Also within the ISM frequency band, wireless data communications have flourished. Presently, different wireless transmission techniques, including Wi-Fi and Bluetooth, have been used as the medium of data communications. In the case of Bluetooth, highly effective personal area networks have been established, whereas in the case of Wi-Fi, wider area wireless networks have been established. FIG. 1 illustrates a typical configuration for a wireless network.

Generally, to establish a wireless data network, wireless network transceivers 150 coupled to personal computers 140 communicate through a wireless access point 160 as is known in the art. Importantly, the wireless transceivers 150 communicate with the access point 160 over the same frequency as does the cordless handset 110 with the base station 120. Yet the wireless data network of modern computing remains completely decoupled from cordless telephony. In this regard, to establish and maintain a telephone call through a cordless base station 120 coupled to a telephone outlet 130, a separate cordless handset 110 will be required.

SUMMARY OF THE INVENTION

The present invention addresses the deficiencies of the art in respect to computer integrated telephony and provides a novel and non-obvious method, system and apparatus for combining cordless telephony and wireless data communications within a single personal computer. In accordance with the present invention, a computer integrated cordless phone can include a cordless handset transceiver configured for coupling to an antenna shared with a wireless network adapter through a multiplexer/demultiplexer so that both of the cordless handset transceiver and the wireless network adapter transmit and receive data within a common wireless frequency spectrum. In a preferred embodiment, the cordless handset transceiver can include a further configuration for coupling to a central processing unit, audio processing circuitry and power supply within a computing device shared with the wireless network adapter. Notably, the common wireless frequency spectrum can include the ISM frequency band.

When deployed within a personal computer, a computer integrated cordless telephone can include a personal computer having a central processing unit (CPU), display, power supply, audio processing circuitry, a microphone transducer and at least one speaker. A radio frequency antenna can be coupled to a multiplexer/demultiplexer. Importantly, a wireless network transceiver and a cordless telephone transceiver can be disposed within the personal computer. The cordless telephone transceiver can have a communicative link to the microphone transducer and the speaker through the audio processing circuitry. Moreover, both of the transceivers can be coupled to the multiplexer/demultiplexer, can be powered by the power supply, and can share access to the CPU and display.

An integrated computer telephony system can include at least one computer participating in a wireless network and a cordless phone base station bound to a telephone outlet through a cabled connection. A wireless network adapter and cordless handset circuit both can be disposed in the computer. Each can be configured to share common computing resources within the computer. Significantly, the wireless network adapter can establish and maintain data communications in the wireless network, while the cordless handset circuit can establish and maintain cordless telephony with the cordless phone base station.

A method for integrated computer telephony can include the steps of transmitting and receiving data in a personal computer over a wireless network through wireless radio frequency structure. A telephone call further can be established and maintained with a cordless base station through a graphical user interface disposed within the personal computer using the wireless radio frequency structure. Finally, and most importantly, data in the transmitting and receiving steps can be respectively multiplexed and demultiplexed with transmitted and received audio signals processed in the establishing and maintaining steps over the wireless radio frequency structure.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a computer phone. In accordance with the present invention, the functionality of computer integrated telephony can be combined with that of cordless handset technology and a wireless network adapter to produce a wireless computer integrated telephone. Notably, as both conventional wireless network adapters and cordless handsets operate with the ISM frequency spectrum, the circuitry and logic within the computer for transmitting and receiving wireless data can be shared in the establishment and maintenance of a telephone call. In this way, when deployed within a personal computer adapted for use in a wireless network, an end user can establish and maintain telephone calls without coupling the personal computer to a telephone outlet using twisted pair or others such cabling.

Figure 1:
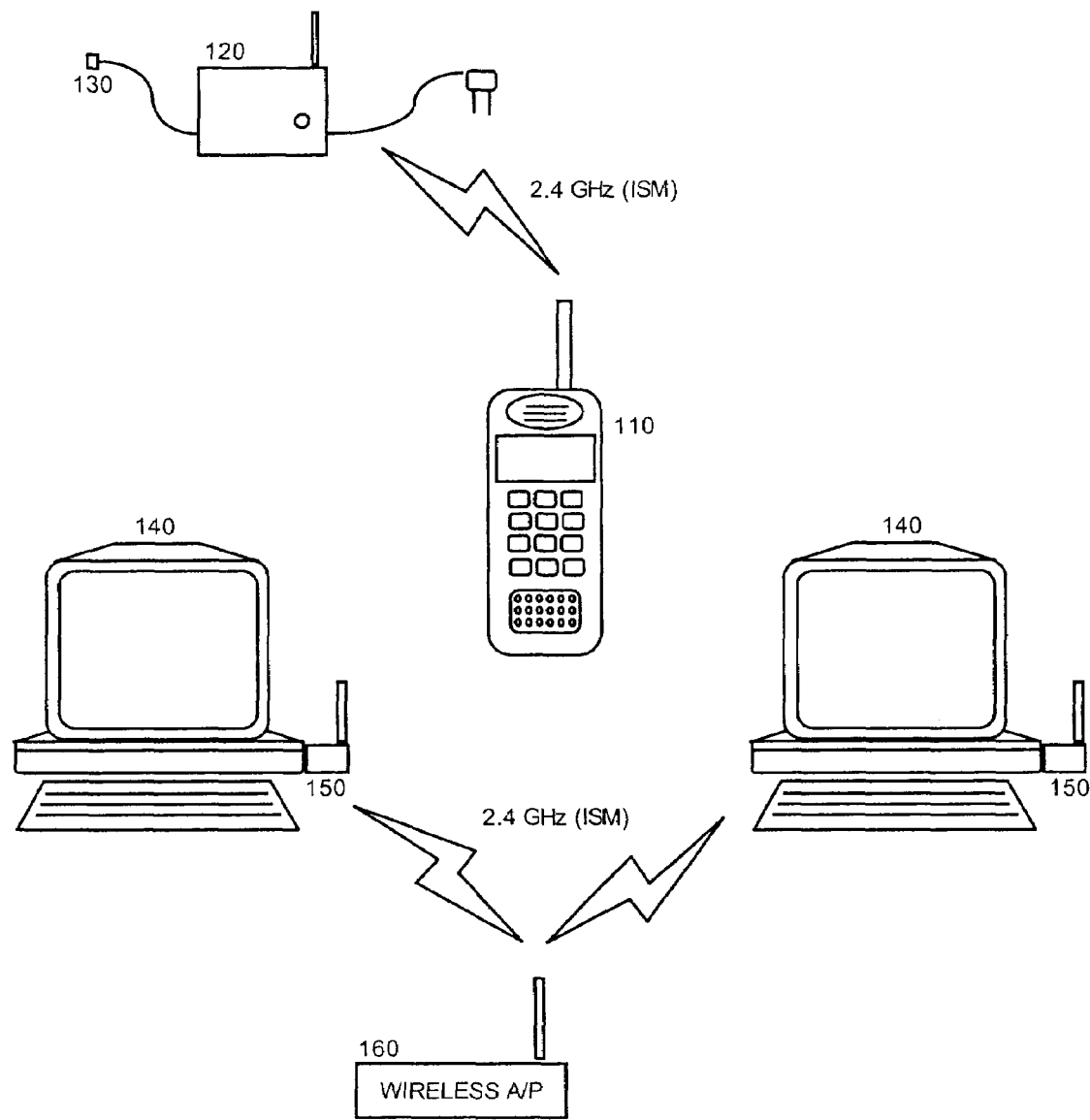
FIG. 1 is a pictorial illustration of a wireless network and a decoupled cordless phone system, both known in the art.
Figure 2:
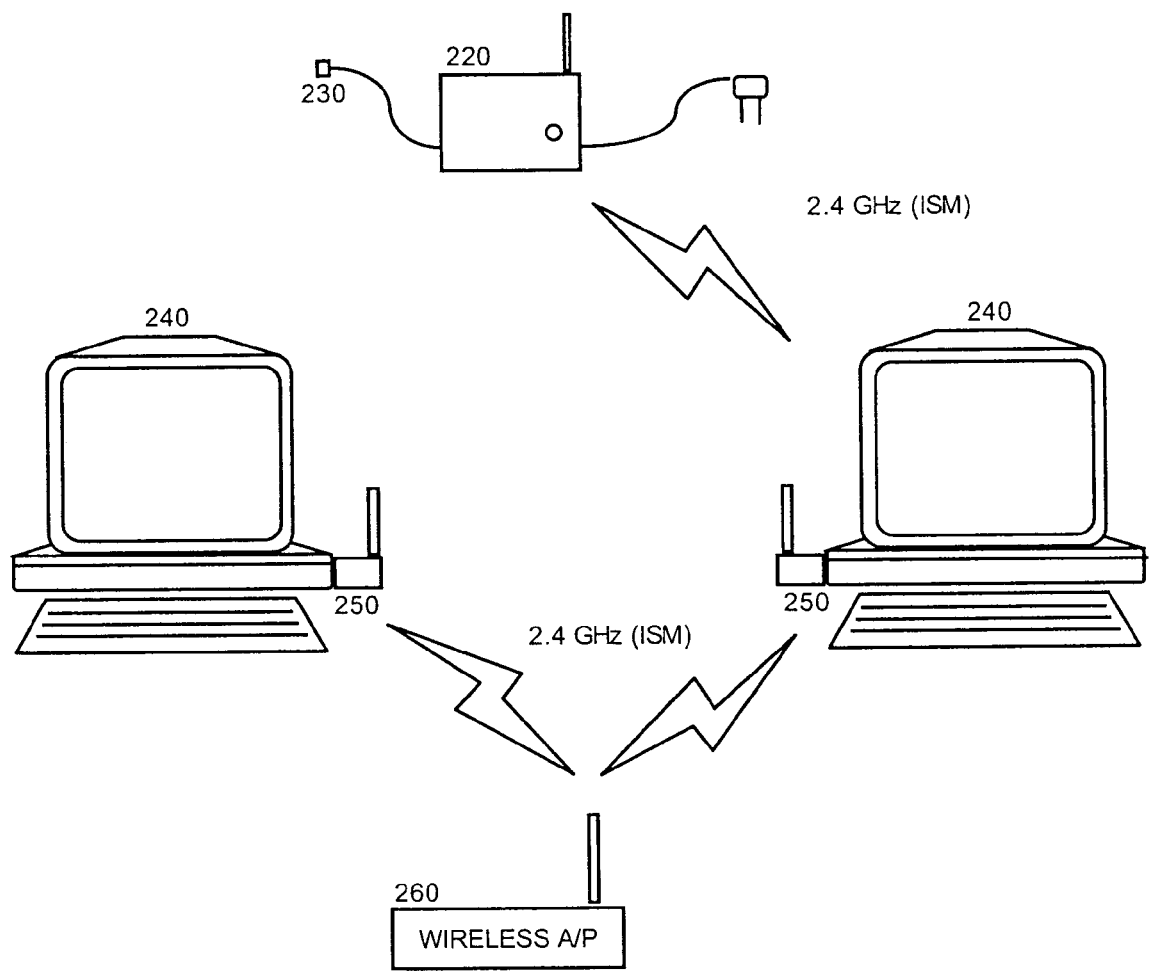
FIG. 2 is a pictorial illustration of a wireless network configured for cordless telephony in accordance with the present invention; and, FIG. 3 is a schematic illustration of an integrated computer phone for use in the wireless network of FIG. 2.

FIG. 2 is a pictorial illustration of a wireless network configured for cordless telephony in accordance with the present invention. As shown in FIG. 2, the wireless network can include one or more personal computers 240 configured with wireless network adapters 250. Each of the wireless network adapters 250 can communicate with one another directly in an ad-hoc network configuration, or the wireless network adapters 250 can communicate through a centralized wireless access point 260. Importantly, the personal computers 240 further can be communicatively coupled to a cordless handset base station 220 which can be linked to a telephone outlet 230.

To establish a cordless telephone call through the base station 220, much of the existing infrastructure of the personal computer 240 and the wireless network adapter 250 can be re-used by the cordless handset circuitry and logic (not shown). In particular, the microphone, speakers and audio processing circuitry and logic can be used to process audio data. The cordless handset circuitry and logic can be powered by the on board power system and the audio data can be transmitted to and received from the cordless base station 220 through an existing radio frequency transceiver.

Figure 3:
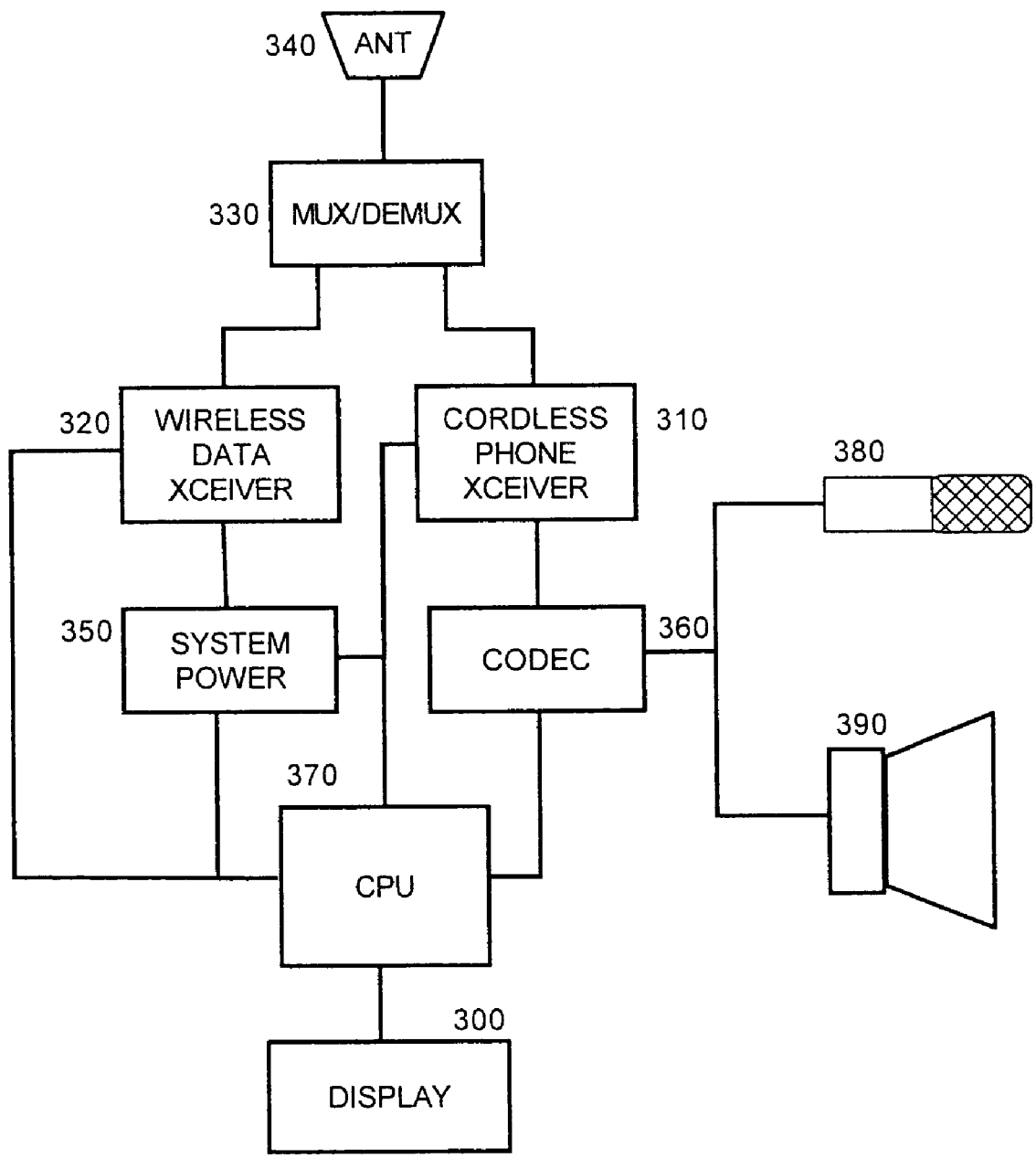

In more particular illustration, FIG. 3 is a schematic illustration of an integrated computer phone for use in the wireless network of FIG. 2. The computer integrated phone of the present invention can include both a wireless data transceiver 320 commonly found in a conventional wireless network adapter, and also a cordless phone transceiver 310. The cordless phone transceiver 310 can include conventional circuitry and logic required to establish and maintain a telephone call with a cordless base station. The conventional circuitry and logic of a cordless phone transceiver 310 is well-known in the art and have been implemented in a discrete manner as well as within large scale integrated circuits commercially available "off the shelf".

Unlike existing cordless phone transceivers available in the art, the cordless phone transceiver 310 of the present invention can be coupled to a multiplexer/demultiplexer 330 along with the wireless data transceiver 320 so that both can share the same antenna 340 for communicating within a common frequency spectrum, for instance within the 2.4 GHz ISM frequency spectrum. Both the cordless phone transceiver 310 and the wireless data transceiver 320 further can share a common power source 350 and a common central processing unit 370. A pre-existing microphone transducer 380 and speaker 390 can be yet further coupled to the cordless phone transceiver 310 through a pre-existing codec 360, which optionally can be incorporated as part of pre-existing audio processing circuitry (not shown).

It will be recognized by the skilled artisan, however, that it is within the spirit of the invention to extend the integrated computer phone to include a wireless phone transceiver and wireless data transceiver which operate within somewhat different frequency spectrums, including, for example, the 5.8 GHz wireless phone spectrum. In this case, a multiplexer would not necessarily be required for the transmitting circuitry as some different transceiving components will be required within the transceiver to accommodate separate frequency spectrums. Nevertheless, most of the shared componentry can remain shared so as to achieve the principal benefit of the present invention.

Returning now to FIG. 3, in operation, the CPU 370 can process data transmitted and received by the wireless data transceiver 320 over a communicatively linked wireless data network (not shown). Outgoing wireless traffic can be multiplexed onto a wireless outbound signal, and incoming wireless traffic can be demultiplexed into the wireless data transceiver as appropriate. Similarly, outgoing cordless phone traffic can be multiplexed onto a wireless outbound signal, and incoming cordless phone traffic can be demultiplexed into the cordless phone transceiver as appropriate.

Telephone calls can be initiated through a graphical user interface presented in the display 300 much in the same way as would be the case through a modem in the example of a computer integrated telephone bound by cabling to a telephone outlet. In the computer phone of the present invention, however, outgoing telephone traffic can be multiplexed to the antenna 340 and transmitted wirelessly to the cordless base station. Notably, though both the wireless data transceiver 320 and the cordless phone transceiver 310 are shown to share only the antenna 340, the present invention is not so limited and further common radio frequency transmission components can be shared on the antenna 340 side of the multiplexer/demultiplexer 330, for instance an RF transceiver including filter, VCO and PLL, synthesizer, bit/frame sync block and the like.

The present invention can be realized in hardware, software, or a combination of hardware and software. Any kind of computer system, or other apparatus adapted for carrying out the methods described herein, is suited to perform the functions described herein. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A computer integrated cordless phone comprising
a cordless handset transceiver configured for coupling to an antenna shared with a wireless computer network adapter through a multiplexer/demultiplexer, wherein
both said cordless handset transceiver and said wireless computer network adapter transmit and receive data within a common wireless frequency spectrum, wherein
the wireless computer network adapter is configured to wirelessly communicate with a wireless computer network of computing devices coupled to one another via a wireless access point.

2. The computer integrated cordless phone of claim 1, wherein said cordless handset transceiver comprises a further configuration for coupling to a central processing unit, audio processing circuitry and power supply within a computing device shared with said wireless computer network adapter.

3. The computer integrated cordless phone of claim 1, wherein said common wireless frequency spectrum comprises the industrial scientific medical band.

4. A computer integrated cordless telephone comprising:
a personal computer having a central processing unit (CPU), display, power supply, audio processing circuitry, a microphone transducer and at least one speaker;
a radio frequency antenna coupled to a multiplexer/demultiplexer;
a wireless computer network transceiver and a cordless telephone transceiver disposed within said personal computer, said cordless telephone transceiver having a communicative link to said microphone transducer and said at least one speaker through said audio processing circuitry, wherein both of said transceivers are coupled to said multiplexer/demultiplexer, are powered by said power supply, and share access to said CPU and display, wherein
the wireless computer network transceiver is configured to wirelessly communicate with a wireless computer network of computing devices coupled to one another via a wireless access point.

5. An integrated computer telephony system comprising:
at least one computer participating in a wireless computer network;
a cordless phone base station bound to a telephone outlet through a cabled connection; and,
a wireless computer network adapter and cordless handset circuit both disposed in said at least one computer and configured to share common computing resources within said at least one computer, said wireless computer network adapter establishing and maintaining data communications in said wireless computer network, said cordless handset circuit establishing and maintaining cordless telephony with said cordless phone base station, wherein
the wireless computer network adapter is configured to wirelessly communicate with a wireless computer network of computing devices coupled to one another via a wireless access point.

6. The integrated computer telephony system of claim 5, wherein said cordless handset circuit establishes and maintains said cordless telephony with said base station in a frequency spectrum which differs from a frequency spectrum in which said wireless computer network adapter establishes and maintains data communications in said wireless computer network.

7. The integrated computer telephony system of claim 6, wherein said wireless computer network adapter and said cordless handset circuit share common information transceiving circuitry with one another in a single personal computer device.

8. A method for integrated computer telephony, comprising the steps of:
transmitting and receiving data in a personal computer over a wireless computer network of computing devices coupled to one another via a wireless access point through wireless radio frequency structure;
further establishing and maintaining a telephone call with a cordless base station through a graphical user interface disposed within said personal computer using said wireless radio frequency structure; and,
respectively multiplexing and demultiplexing data in said transmitting and receiving steps with transmitted and received audio signals processed in said establishing and maintaining steps over said wireless radio frequency structure.

9. A machine readable storage comprising a computer program for providing integrated computer telephony, said computer program comprising a routine set of instructions for causing the machine to perform the steps of:
transmitting and receiving data in a personal computer over a wireless computer network of computing devices coupled to one another via a wireless access point through wireless radio frequency structure;
further establishing and maintaining a telephone call with a cordless base station through a graphical user interface disposed within said personal computer using said wireless radio frequency structure; and,
respectively multiplexing and demultiplexing data in said transmitting and receiving steps with transmitted and received audio signals processed in said establishing and maintaining steps over said wireless radio frequency structure.

* * * * *